Patented Nov. 18, 1941

2,263,385

UNITED STATES PATENT OFFICE 2,263,385

PROCESS FOR DYEING LEATHER

Otto Grimm, Darmstadt, Germany, assignor to
Röhm & Haas Company, Philadelphia, Pa.

No Drawing. Application May 12, 1939, Serial
No. 273,200. In Germany May 16, 1938

8 Claims. (Cl. 8—12)

This invention relates to a method for dyeing leather. It relates more particularly to a method for fixing basic dyes in leather by means of water-soluble polymeric carboxylic acids and their water-soluble derivatives which are capable of forming insoluble substances with basic dyes.

It is the object of this invention to provide a method for fixing basic dyes in leather in such a manner that a full, deep and abrasion-resistant color is imparted to the leather.

This object is accomplished by a two-step dyeing process. In one step the leather is treated with the desired basic dyestuff and in the other step with a water-soluble polymeric carboxylic acid or one of its water-soluble derivatives. The order in which the steps are carried out is immaterial, either the dye or the water-soluble polymeric material can be used for the first treatment. If, however, it is desired to prevent complete penetration of the color, the leather may first be treated with the water-soluble polymer and the dye applied to one side only of the treated leather. When a full, brilliant color is desired, it is preferable to treat the leather first with the water-soluble polymeric material followed by the dye. The reverse order is preferable when an extra-high resistance to crocking is desired. The leather may also be treated with the water-soluble polymer both before and after dyeing and in this way get the double advantage of full, brilliant color and high resistance to crocking.

The polymeric substances with which this invention is concerned are substances containing carboxyl groups which in the form of the free acid are soluble in water or else are capable of forming water-soluble salts with alkali metals, ammonia or simple amines. Such polymers can be obtained by polymerizing $\alpha,\beta$-unsaturated carboxylic acids containing a

group either alone or mixed with each other or with other polymerizable organic compounds containing the

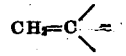

group. They may also be obtained by complete or partial hydrolysis or saponification of water-insoluble polymers containing ester, amide, nitrile or other groups which on hydrolysis can be converted to carboxyl groups. Acids which are the basis of the polymerizable compounds are acrylic acid, methacrylic and other $\alpha$-alkacrylic acids, the polymeric esters, amides, nitriles, etc. of which may be completely or partially hydrolyzed or saponified to yield the polymeric materials which unite with the basic dyes to form the insoluble coloring matter.

In addition to the above-mentioned polymers, joint polymers containing carboxyl or saponifiable groups are also operable. These joint polymers may be prepared from a polymerizable material containing no saponifiable groups and one or more polymerizable acids or materials of the type described which do contain such saponifiable groups. In such cases the proportion of saponifiable material or acid must be great enough so that the final polymer and its alkali, ammonia or simple amine salts are soluble in water. Examples of such polymerizable materials containing no saponifiable groups are styrene, vinyl chloride, butadiene, coumarone, etc.

Furthermore, unsaturated acids or their esters which of themselves do not polymerize spontaneously may be polymerized jointly with compounds of the types described above to yield water-soluble materials suitable for use in the process of dyeing leather described herein. Maleic acid is an example of this kind of acid.

The formation of the insoluble polymer-basic dye complex is due to the presence of the carboxyl group in the polymer which probably unites with the basic group of the dye to form an insoluble complex probably having the character of a salt. Polymeric vinyl alcohol does not work alone but it may be a constituent of a saponified joint polymer containing sufficient carboxyl groups to render it soluble in water.

The leather dyed by this process has a natural appearance, excellent grain and, furthermore, a greater assortment of colors is available. In addition to this, the color of the leather does not become lighter on drying.

It has already been proposed to use the water-soluble materials herein disclosed as dispersing, emulsifying, thickening and binding media for dyestuffs. In such cases the dye and the polymer are applied in the same solution. Such a process is not possible when basic dyes are used because of the formation in the paste of the insoluble dye-polymer complex.

Other materials may be used in either or both of the steps of the dyeing process, provided they have no effect on the formation of the insoluble dye-polymer complex. For example, acid dyes may be employed and applied to the leather before or after the treatment with the polymeric water-soluble material and the basic dye in order to obtain special effects.

The process is applicable to leather which has been tanned with natural, mineral or synthetic tanning agents, aldehydes, etc. In the case of the mineral and aldehyde-tanned leathers, it is often advantageous to treat them with a small amount of vegetable tan, such as gambir, before dyeing, or to dye them first with a dye wood extract. It is carried out in general as follows:

The leather to be dyed is first drummed or otherwise soaked in a dilute solution of the polymeric acidic material or a salt thereof. The amount of polymeric acid is usually about 0.1 to 0.5% by weight calculated on the dry weight of the leather. Larger amounts may be used if desired but no advantage is obtained. After sufficient soaking the liquid is drained off and the skins immersed in the aqueous solution of the basic dye. The order of these steps may be reversed and the leather soaked first in the dye solution followed by treatment with a solution of the polymeric acidic material or salt thereof. The leather may also be colored on the table by applying to one side only a solution of the basic dye followed by a solution of the polymeric acidic material, or it may first be soaked in the polymeric acidic material and the dye applied to one side only.

The following examples are given to illustrate the invention which however is not limited to the exact polymers, dyes or leather shown, as it may otherwise be practiced within the scope of the appended claims.

Example 1

Chrome leather, which has been treated with gambir after tanning, is fatliquored and dried, glazed and then drummed for 30 minutes in a liquor containing:

| | Per cent |
|---|---|
| Water | 400 |
| Hydrolyzed polyacrylic nitrile | 0.2 | the percentages being calculated on the dry weight of the leather. The hydrolyzed polyacrylic nitrile is prepared by saponifying polyacrylic nitrile with 65% of the amount of sodium hydroxide necessary for complete saponification and neutralizing the resulting solution with formic or acetic acid. The water is then drained off and the treated leather is dyed at about 45° C. with a solution containing:

| | Per cent |
|---|---|
| Water | 150 |
| Euchrysine RRX (Color Index 797) | 0.3 |
| Rheonin AL (Color Index 795) | 0.2 | until the color is completely absorbed. The basic dye is fixed by the polymeric acidic material resulting in a leather of brilliant reddish brown color. The color does not become lighter as the leather is dried.

Example 2

Vegetable-tanned leather is colored on the table with a solution containing:

| | | |
|---|---|---|
| Water | cc | 1000 |
| Chocolate brown RX | g | 5 |
| Canelle AL (Color Index 793) | g | 5 |

The dye is fixed by treating the leather with a 0.2 to 0.5% solution of the hydrolysed polyacrylic nitrile described in Example 1. The resulting leather is of a brown color which does not crock or smudge easily.

Example 3

Chrome-tanned glove leather is treated with gambir and then colored on the table with a solution containing:

| | | |
|---|---|---|
| Water | cc | 1000 |
| Cotton brown RVN | g | 3 |
| Cotton brown GNJ | g | 7 |
| Sodium polyacrylate | g | 3 |

The leather is then further treated on the table with a solution containing:

| | | |
|---|---|---|
| Water | cc | 1000 |
| Chocolate brown RX | g | 3 |

By using the sodium polyacrylate in the preliminary dyeing, a particularly full color is obtained and the basic dye is prevented from striking through to the other side of the leather during the second step.

Example 4

Kid skins are tanned, washed and neutralized in the usual manner and dyed in a liquor consisting of:

| | Per cent |
|---|---|
| Water | 100 |
| Acid leather brown EGR | 1 |
| Igenal brown T | 0.2 | calculated on the shaved weight of the skins. After the dye has been absorbed, which requires about 30 minutes, two-thirds of the water is drained off and a solution containing the following is added:

| | Per cent |
|---|---|
| Water | 12 |
| Hydrolysed polyacrylic nitrile | 0.2 |

The hydrolysed polyacrylic nitrile is the same as that described in Example 1. The leather is drummed in this solution for twenty minutes and the liquor drained off. The leather is then dyed at 45° C. with a basic dye solution containing:

| | Per cent |
|---|---|
| Water | 150 |
| Canelle AL | 0.5 |

The drumming is continued until the dyestuff is completely absorbed.

By the addition of the water-soluble polymer it is possible to obtain a particularly full color which does not change much as the leather dries. It is also possible to obtain this full color without adversely affecting the grain of the leather as often happens with other fixing media such as gambir. The full coloring also makes possible a considerable saving in the amount of dye used.

Other dyes such as Bismark brown (Color Index 332), Euchrysine RR (Color Index 777), Rheonin AL (Color Index 795), Cotton blue (Color Index 910), Diamond green (Color Index 657), Safranin T (Color Index 841), Auramine (Color Index 655), Safranin scarlet G (mixture of Safranin and Auramine), Corvolin BT and Corvolin TM can be used. All of these are basic dyes which form insoluble compounds with the water-soluble polymeric materials described herein.

I claim:

1. The process of dyeing leather which comprises treating the leather in successive steps with a basic dye and a water-soluble polymer of an $\alpha,\beta$-unsaturated carboxylic acid having a terminal methylene group in the $\beta$-position, which is capable of forming an insoluble complex with the dye.

2. The process of dyeing leather which comprises treating the leather in successive steps with a basic dye and a polymer of an $\alpha,\beta$-unsaturated carboxylic acid having a terminal methylene group in the $\beta$-position, said polymer containing a sufficient number of carboxyl groups to render it soluble in aqueous media.

3. The process of dyeing leather which comprises treating the leather in separate steps with a basic dye and with a water-soluble joint polymer of two unsaturated polymerizable substances, at least one of which in its acid form is a polymerizable $\alpha,\beta$-unsaturated carboxylic acid having a terminal methylene group in the $\beta$-position and which yields sufficient carboxyl groups to render the joint polymer soluble in aqueous media.

4. The process of dyeing leather which comprises treating the leather in successive steps with a basic dye and the water-soluble product obtained by saponifying polyacrylic nitrile.

5. The process of dyeing leather which comprises treating the leather in successive steps with a basic dye and the water-soluble product obtained by saponifying a polymeric ester of acrylic acid.

6. The process of dyeing leather which comprises treating the leather in successive steps with a basic dye and the water-soluble product obtained by saponifying polyacrylic nitrile with sufficient alkali to convert approximately 65% of the nitrile groups to carboxyl groups.

7. The process of dyeing leather which comprises treating the leather with a solution of a water-soluble product obtained by saponifying acrylic nitrile and then with a basic dye which forms an insoluble complex with the soluble polymeric material.

8. The process of dyeing leather which comprises treating the leather with a solution of a water-soluble product obtained by saponifying a polymeric ester of acrylic acid and then with a basic dye which forms an insoluble complex with the soluble polymeric material.

OTTO GRIMM.